March 16, 1926.
W. R. SMITH
1,577,000
GAME TRAP
Filed April 12, 1923
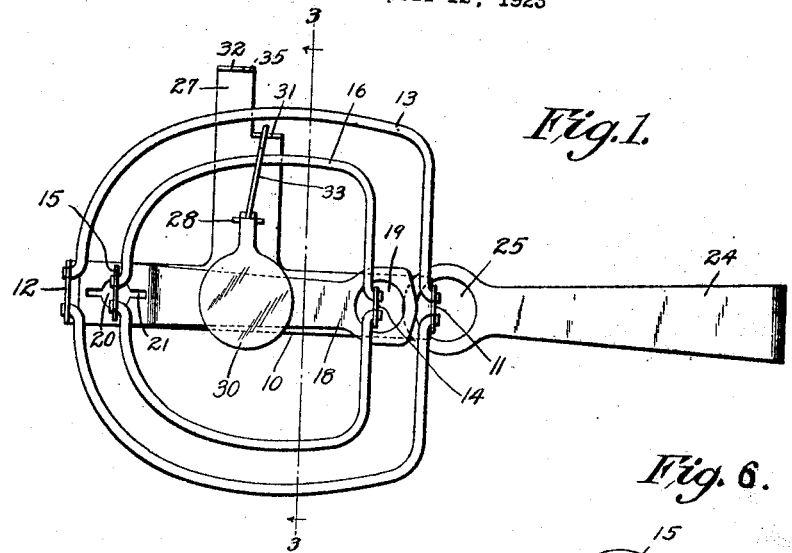
Fig. 1.
Fig. 6.
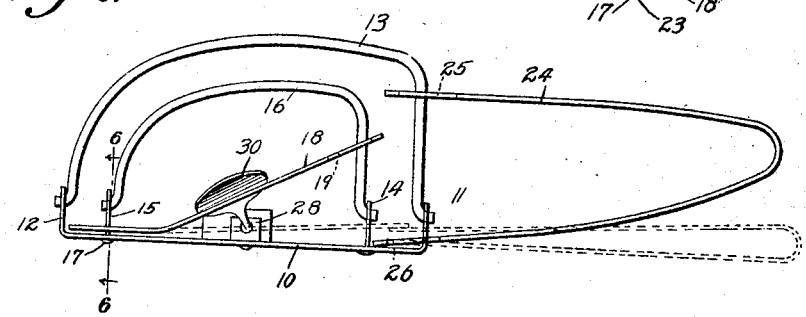
Fig. 2.
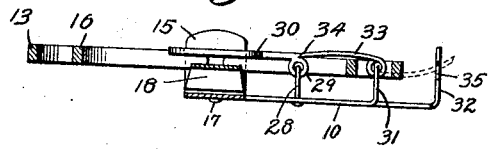
Fig. 3.
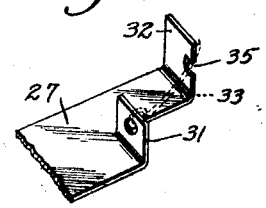
Fig. 4.
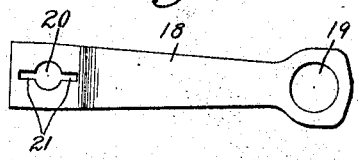
Fig. 5.
Inventor
Walter R. Smith,
By
Attorney Patented Mar. 16, 1926.

1,577,000

UNITED STATES PATENT OFFICE.

WALTER RICHARD SMITH, OF NEW ORLEANS, LOUISIANA.

GAME TRAP.

Application filed April 12, 1923. Serial No. 631,599.

*To all whom it may concern:*

Be it known that I, WALTER R. SMITH, a citizen of the United States, residing at New Orleans, in the parish of Orleans and State of Louisiana, have invented a new and useful Improvement in Game Traps, of which the following is a specification.

This invention relates to improvements in game traps, and more particularly to game traps having a plurality of pairs of jaws.

An important object of the present invention is to provide means for temporarily locking one pair of jaws in open position while the other pair of jaws is being opened.

Another object of the invention is to provide an arrangement of springs for closing the jaws of the trap whereby after one of the springs is placed under tension it may be held in that position by engagement with a second spring.

A further object of the invention is to provide a spring for the inner pairs of jaws which has an interlocking connection with one of the pivot posts whereby the spring may be removed and a new spring placed in the trap without the use of any tools.

Other objects and advantages will be apparent during the course of the following description.

In the accompanying drawings forming part of this specification, and in which like numerals are employed to designate like parts throughout the same, Figure 1 is a plan view of a game trap constructed in accordance with this invention, and shown set, Fig. 2 is a side elevation of the same, the trap being sprung, Fig. 3 is a sectional view on the line 3—3 of Fig. 1, Fig. 4 is a detail perspective view of a portion of the base of the trap, showing the means for temporarily locking the outer pair of jaws in open position, Fig. 5 is a detail plan view of the spring for the inner pair of jaws, and Fig. 6 is a section on the line 6—6 of Fig. 2 showing the pivot post with the jaws removed, and in dotted lines the initial position of the inner spring in assembling the trap.

In the drawings, wherein for the purpose of illustration is shown a preferred embodiment of the invention, the numeral 10 designates the T-shaped base of the trap which is preferably formed of a single piece of sheet metal or other suitable material. The ends of the laterally extending arms of the T-shaped base are bent upwardly to form pivot posts 11 and 12 for the ends of the outer pair of jaws 13. Spaced from the pivot posts 11 and 12 are pivot posts 14 and 15 for the inner pair of jaws 16, the pivot posts 14 and 15 being rigidly attached to the base member 10 by riveting the same thereto in the manner indicated at 17 in Fig. 6. The spring 18 for the inner pair of jaws 16 is provided at one end with an eye or opening 19 for engagement with the jaws to close the same, and at the other end the spring 18 is provided with an opening 20 having slots 21 extending from opposite sides thereof longitudinally of the spring. The pivot post 15 is provided near the bottom thereof with notches 22 providing a neck portion 23 of a width slightly less than the diameter of the circular opening 20 in the spring 18. In assembling the inner pair of jaws 16 one end thereof is inserted through the eye or opening 19 in the spring 18 and the spring is then turned at a right angle to the position shown in Figs. 1 and 2 to permit the spring to be slid down upon the pivot post 15 until the notched portion 22 is reached after which the spring may be turned to the position shown in Figs. 1 and 2 and the spring thereby locked in position on the pivot post 15. The pivot points of one end of the inner pair of jaws are then inserted into the openings in one of the pivot posts 14 or 15 after which the jaw members 16 may be slightly compressed longitudinally thereof to permit the pivot points at the end of the jaws to be inserted into the openings in the other pivot post. When it is desired to remove the spring 18 to replace the same with a new spring the reverse of the above operation is followed; namely, the jaws 16 are slightly compressed longitudinally thereof to permit the removal of the pivot points from one of the pivot posts 14 or 15 after which the pivot points are removed from the other pivot post and the spring 18 is then given a quarter turn around the pivot post 15 to permit the same to be slid upwardly over the pivot post 15.

At one end of the outer pair of jaws 13 is a substantially U-shaped spring 24 having an eye or opening 25 in one of its terminal portions adapted to engage the jaws 13 and normally tend to close the same, and having an eye or opening 26 in its other terminal portion surrounding the pivot post 11.

The arm 27 of the T-shaped base is provided with a post 28 which is attached thereto by riveting in the same manner as described in connection with the pivot posts 14 and 15. The post 28 is provided with an eye or opening to receive the eye or link 29 of a bait pan or plate 30. At its outer end the arm 27 is slit to provide long and short portions which are bent upwardly to form ears 31 and 32 as shown in Figs. 3 and 4, the ear 31 forming a hinge post for the latch or trigger 33 one end of which engages a shoulder 34 on the bait plate 30 in the usual manner. The ear 32 is offset laterally with respect to the ear 31 and is provided with a notch or slot 35 adapted to receive the trigger 33 when in the dotted line position indicated in Figs. 3 and 4.

The arrangement of the springs 18 and 24 is such that the spring 24 may be compressed or moved to the dotted line position shown in Fig. 2 without contacting with the spring 18, to permit the outer pair of jaws to be opened, after which the spring 18 may be pressed downwardly into overlapping engagement with the spring 24 to hold the same compressed; and in the closing movement of the jaws the springs 18 and 24 move upwardly together until they are out of contact with each other, after which the springs move separately toward the positions shown in full lines in Fig. 2.

In setting the trap the spring 24 is first compressed to permit the outer pair of jaws 13 to be opened. The latch member 33 is then swung over the jaw 13 to the dotted line position shown in Figs. 3 and 4 and moved into the notch 35 in the ear 32 to thereby temporarily hold the outer jaws in open position. The inner spring 18 is then moved downwardly to the position shown in full lines in Fig. 1 and in dotted lines in Fig. 2 in which it is in overlapping engagement with the upper terminal portion of the spring 24. The inner jaws 16 may then be moved to open position to thereby hold both springs 18 and 24 under tension. The latch member 33 is then moved from the dotted line position shown in Figs. 3 and 4 and swung over the inner jaw 16 into engagement with the shoulder 34 on the bait plate 30, which completes the setting of the trap.

The trap is sprung by an animal depressing the bait plate 30 which allows the latch 33 to swing upwardly thereby releasing the inner pair of jaws 16, the upward movement of the spring also permitting the upper portion of the spring 24 to move upwardly to thereby close the outer pair of jaws, the spring 24 having an additional upward movement after the same is released from contact with the spring 18.

It is to be understood that the form of my invention herewith shown and described is to be taken as a preferred example of the same, and that various changes in the shape, size, and arrangement of parts may be resorted to without departing from the spirit of my invention, or the scope of the appended claims.

A trigger, similar to that disclosed in my Patent No. 1,448,467 may be mounted on the ear 32.

Having thus described my invention, I claim:—

1. In a game trap, the combination with a pair of jaws, a support at each end of said jaws for pivotally supporting the same, a spring for closing said jaws, means including a bait pan for setting said jaws, the spring having an opening whereby to slide the spring over one of said supports past the pivot point of the respective support and turned into interlocking engagement with the support and whereby said spring is removably held in place.

2. A trap of the class described, comprising an outer pair of jaws, and a spring for closing the same, an inner pair of jaws and a spring for closing the same, a bait pan having connection with the base, means for temporarily holding said outer pair of jaws in open position, said means being subsequently shiftable to engage the bait pan and the inner pair of jaws for restraining said outer pair of jaws and for maintaining both pair of jaws in open position.

3. In a trap, the combination with a pair of jaws, a support at each end of the said jaws for pivotally supporting the same, a spring for closing said jaws, a bait pan having connection with the base, means movable into and out of operative position with the bait pan for setting the jaws, one of said supports being reduced adjacent its lower end to form a neck portion and said spring having an opening whereby to permit slidable movement of said spring downwardly over the respective support below the pivotal point of the jaws with said support and shiftable laterally into interlocking engagement with said neck portion, whereby said spring is removably held in place.

4. A trap of the class described comprising a plurality of pairs of jaws, springs for closing said jaws, a base on which said jaws are mounted, a bait pan supported on said base, the base having an ear provided with a notch, a latch for engagement with said notch and also shiftable into detachable engagement with the bait pan to restrain said outer pair of jaws when both pairs of jaws are in open position.

5. A trap of the class described, comprising an outer pair of jaws, a spring for closing said jaws, an inner pair of jaws, a spring for closing the inner pair of jaws, means, including a bait pan for temporarily holding said outer pair of jaws in open position, said means being adapted to engage one of said inner pair of jaws for restraining said outer pair of jaws when both pairs of jaws are in open position, the spring of the inner pair of jaws being adapted to overlap a portion of the spring of the outer pair of jaws when both pairs of jaws are open, whereby upon release of the aforesaid means, both pairs of jaws start to closing position together until the overlapping springs separate when the inner springs close quickly followed by a closing of the outer springs.

6. A trap of the class described, comprising a plurality of pairs of jaws, springs for closing said jaws, a bait pan on the base, and a latch for holding the outer pair of jaws in open position while the inner jaws are being opened, said latch being adapted to engage the bait pan and one of said inner pair of jaws to restrain said outer pair of jaws after both pairs of jaws are in open position.

7. A trap of the class described, comprising an outer pair of jaws, a substantially U-shaped spring for closing said jaws, an inner pair of jaws, a jump spring for closing said jaws, a bait pan supported on the trap, a latch for temporarily holding said outer jaws in open position, and means on said jump spring for holding said substantially U-shaped spring under tension when both pairs of jaws are in open position, said latch being also adapted to engage one of said inner pair of jaws and the bait pan to thereby hold both pairs of jaws in open position when the trap is set.

8. A trap of the class described, comprising a base, inner and outer pairs of jaws pivoted to said base, springs for closing said jaws, a bait pan having connection with the base, the spring for said inner pair of jaws being adapted to hold under tension the spring for said outer pair of jaws when both pairs of jaws are in open position, a member hinged to said base and adapted when in one position to temporarily hold said outer jaws in open position, said member being also adapted when both of said pairs of jaws are in open position to engage one of the inner pair of jaws and the bait pan and thereby hold both of said pairs of jaws in open position.

In testimony whereof I have hereunto set my hand.

WALTER RICHARD SMITH.